United States Patent
Oswald et al.

(10) Patent No.: US 8,426,990 B2
(45) Date of Patent: Apr. 23, 2013

(54) TURBINE APPARATUS

(76) Inventors: Johannes Oswald, Miltenberg (DE); Michael Walter, Miltenberg (DE)

( * ) Notice: Subject to any disclaimer, the term of this patent is extended or adjusted under 35 U.S.C. 154(b) by 630 days.

(21) Appl. No.: 12/441,532

(22) PCT Filed: Sep. 14, 2007

(86) PCT No.: PCT/DE2007/001646
§ 371 (c)(1),
(2), (4) Date: Mar. 3, 2010

(87) PCT Pub. No.: WO2008/031426
PCT Pub. Date: Mar. 20, 2008

(65) Prior Publication Data
US 2011/0018266 A1    Jan. 27, 2011

(30) Foreign Application Priority Data
Sep. 14, 2006   (DE) .......................... 10 2006 043 946

(51) Int. Cl.
| | | |
|---|---|---|
| *F03B 13/00* | (2006.01) | |
| *F03B 13/10* | (2006.01) | |
| *H02P 9/04* | (2006.01) | |
| *H02K 7/00* | (2006.01) | |
| *H02K 11/00* | (2006.01) | |
| *F16C 1/24* | (2006.01) | |
| *F16C 3/14* | (2006.01) | |

(52) U.S. Cl.
USPC ............................ 290/43; 310/67 R; 384/319

(58) Field of Classification Search .................... 290/43; 310/67 R; 384/319
See application file for complete search history.

(56) References Cited

U.S. PATENT DOCUMENTS

| | | | | |
|---|---|---|---|---|
| 2,649,048 A | * | 8/1953 | Pezzillo et al. | 417/357 |
| 3,658,436 A | * | 4/1972 | Oishi et al. | 415/1 |
| 3,793,698 A | * | 2/1974 | Goings | 29/402.18 |
| 4,023,866 A | * | 5/1977 | Gutierrez Atencio | 384/319 |
| 4,380,401 A | * | 4/1983 | Chacour et al. | 384/438 |
| 4,674,279 A | * | 6/1987 | Ali et al. | 60/398 |
| 4,754,155 A | * | 6/1988 | Obermeyer | 290/52 |
| 5,261,787 A | * | 11/1993 | Morgunov | 415/208.1 |
| 5,322,412 A | * | 6/1994 | Erlach | 415/1 |
| 5,742,515 A | * | 4/1998 | Runkle et al. | 700/287 |
| 5,754,446 A | * | 5/1998 | Fisher et al. | 700/287 |
| 5,905,311 A | * | 5/1999 | Hess et al. | 290/52 |
| 5,954,474 A | * | 9/1999 | Fisher et al. | 415/17 |
| 6,104,097 A | * | 8/2000 | Lehoczky | 290/54 |
| 6,254,339 B1 | * | 7/2001 | Fisher et al. | 415/173.1 |
| 6,269,287 B1 | * | 7/2001 | March | 700/287 |

(Continued)

*Primary Examiner* — Pedro J Cuevas
(74) *Attorney, Agent, or Firm* — Michael L. Greenberg, Esq.; Greenberg & Lieberman, LLC

(57) ABSTRACT

Turbine apparatus for a hydroelectric power station, with a turbine impeller, which is capable of rotating about a turbine rotary spindle, which is in particular arranged vertically, with turbine blades (4), which are fitted at an angle with respect to the turbine impeller (3), in particular a fixed angle, with a generator, which converts the mechanical rotation energy of the turbine impeller into electrical energy, wherein the generator is in particular an annular generator (5), with an annular rotor (6) and a stator (7), which is correspondingly arranged in annular fashion, wherein the turbine rotary spindle (2) is coupled to the rotor (6) in such a way that it is fixed against rotation, and the rotation about the turbine rotary spindle (2) takes place by means of a hollow shaft (8), with a pot-like receptacle (9), into which a fixed bearing journal (10) with movable bearings (11) arranged around it is inserted, in particular directly, and the turbine impeller (3) and the rotor (6) are capable of rotating about the bearing journal (10).

3 Claims, 2 Drawing Sheets

U.S. PATENT DOCUMENTS

Figure 1:
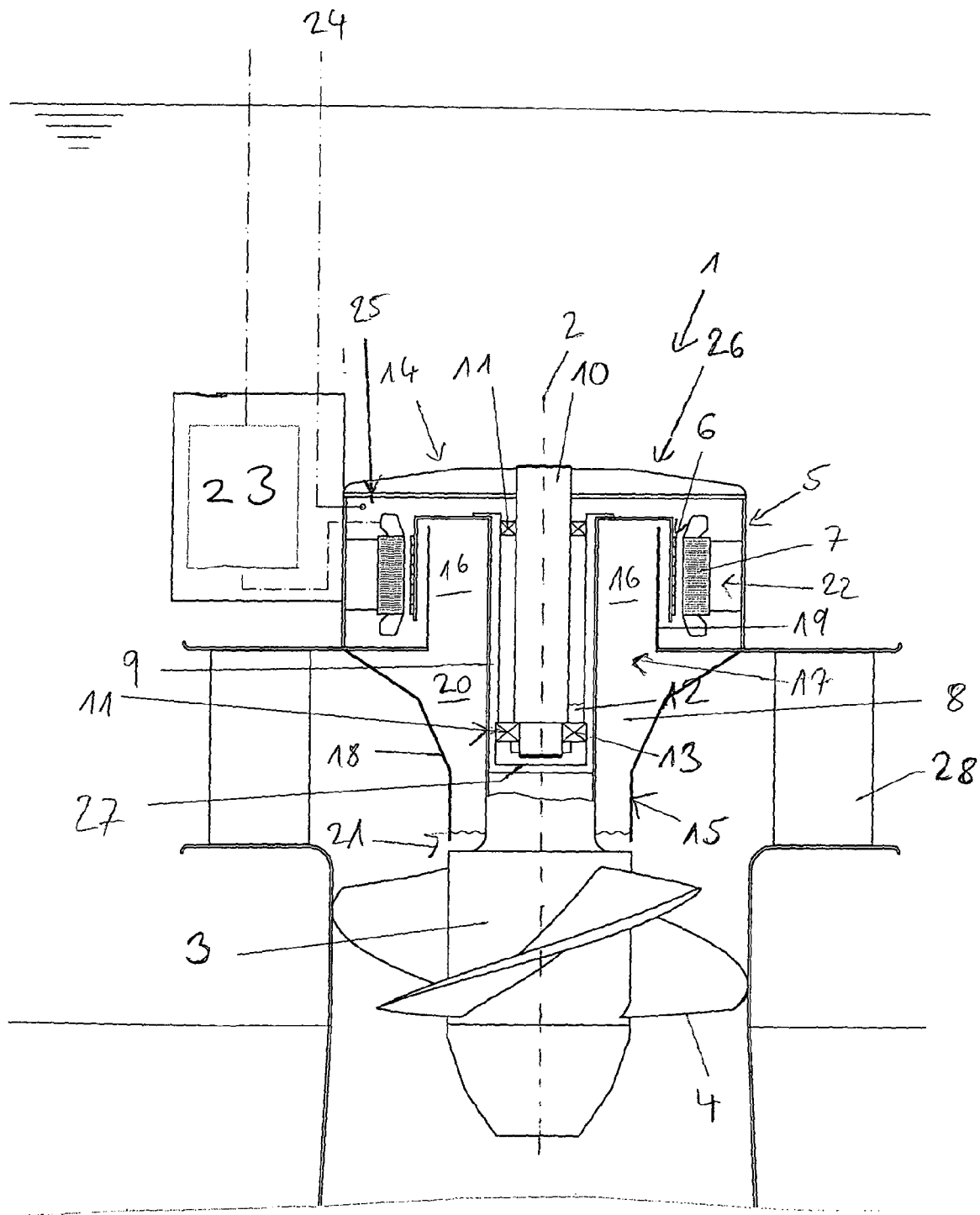

| | | | | |
|---|---|---|---|---|
| 6,307,291 B1 * | 10/2001 | Iwaki et al. | | 310/90 |
| 6,339,273 B1 * | 1/2002 | Higuchi | | 310/91 |
| 6,490,506 B1 * | 12/2002 | March | | 700/286 |
| 6,533,536 B1 * | 3/2003 | Fisher et al. | | 415/17 |
| 6,700,256 B2 * | 3/2004 | Fukutani et al. | | 310/90 |
| 6,841,893 B2 * | 1/2005 | Maiwald et al. | | 290/43 |
| 6,853,102 B2 * | 2/2005 | Itaya et al. | | 310/67 R |
| 6,864,596 B2 * | 3/2005 | Maiwald et al. | | 290/54 |
| 7,035,718 B2 * | 4/2006 | Jensen et al. | | 700/280 |
| 7,471,009 B2 * | 12/2008 | Davis et al. | | 290/54 |
| 8,022,567 B2 * | 9/2011 | Davis et al. | | 290/54 |
| 2004/0066043 A1 * | 4/2004 | Maiwald et al. | | 290/43 |
| 2004/0220701 A1 * | 11/2004 | Maiwald et al. | | 700/287 |
| 2005/0285407 A1 * | 12/2005 | Davis et al. | | 290/54 |
| 2009/0243300 A1 * | 10/2009 | Davis et al. | | 290/54 |
| 2010/0007148 A1 * | 1/2010 | Davis et al. | | 290/54 |
| 2012/0146330 A1 * | 6/2012 | Shifrin et al. | | 290/43 |

* cited by examiner

TURBINE APPARATUS

The invention concerns a turbine device for a hydropower plant, with a turbine wheel rotating around a particularly vertically orientated turbine rotation axis and having turbine vanes fitted in a particularly fixed angle to the turbine wheel, with a generator that converts the mechanical rotation energy of the turbine wheel into electrical energy where the generator is particularly a ring generator, with a circular rotor and an accordingly circularly arranged stator.

In case of turbine devices of the state of the art, it particularly turns out as disadvantageous that they have a very projecting construction and require a high maintenance effort.

The object of this invention is to provide a turbine device that can be built easily and offers a long lifetime.

The problem is solved by the turbine device stated above where the turbine rotation axis is coupled to the rotor in rotationally fixed manner and the rotation around the turbine rotation axis is carried out by a hollow shaft, with a cup-like receptacle into which a fixed journal with circumjacently arranged movable bearings is particularly directly inserted, and the turbine wheel and the rotor are rotable around the journal.

The proposed turbine device is a very compact and stable construction and can be used completely below the water level. In particular, a use in small-size hydropower plants is advantageous because a low water level is sufficient due to the compact style. The turbine device can be operated without a sensor so that a central access to the journal in the receptacle of the hollow shaft is easily possible without having to dismount the turbine device.

Particularly in the form of the cartridge, the proposed device can also be used to modernize existing turbines, in particular to increase the power output.

It is of advantage if the generator is a synchronous generator where the rotor is particularly equipped with permanent magnets. The synchronous generator can be regulated in a speed-variable manner by means of a regulated converter so that there is an optimal power output without having to perform a time-consuming setting of the turbine vanes. With the use of the permanent magnets, no sliding contact is required that is very wear-prone.

A low maintenance effort is present if the cup-like receptacle is filled with a lubricant, especially oil, in a predefined quantity, especially outreaching beyond a lower support bearing. In the lubricant-filled receptacle, the bearings are running very freely where, however, the lubricant stays clean because there is no abrasion. Moreover, due to the positioning under water, the lubricant is not loaded with high temperatures. Due to the low speeds, no foam arises. The lubricant retention is environmentally friendly because no lubricant can leak.

A particularly compact device is present if the hollow shaft is formed integrally with the rotor.

A simple and quick replacement of the bearings and especially of the lubricating liquid, too, is possible, if the cup-like receptacle is formed by a cartridge coupled to the hollow shaft in a rotationally fixed manner where the cartridge contains the lubricant and the journal with the bearings.

A maintenance or repair, in particular, a lubricant replacement, can be carried out in an easy way if the cartridge can be detached from the hollow shaft, especially by releasing fastening means between cartridge edge and hollow shaft edge, and, in particular, can be removed together with the lubricant.

A removal of the journal is eased if the journal is arranged in a covering device that terminates the turbine device at least at the upper side where the journal together with the bearings can be removed from the cup-like receptacle by removing the covering device. Moreover, a very compact arrangement is given with such a construction.

It is of advantage if the generator is enclosed by a particularly bell-like enclosure that, at least in the operation, is merely open to below in order to create a gas counterpressure zone. The water ingressing into the enclosure zone from below is retarded by a counterpressure inside the enclosure until a balance has been reached and a gas cushion causes the water to be held off from the enclosure and, thus, from the environment of the generator.

An additional protection against a contact of water with the generator in case of a possible ingression into the enclosure is given if, in the interior of the enclosure, a circular protection means sealed toward an enclosure wall is used that comprises an interspace with the opening of the enclosure and excludes a zone of the generator.

It is of advantage if a converter electrically connected with the generator is directly attached to the enclosure. By doing this, long repair-prone lines between converter and generator that would have to be particularly shielded under water are not required. With an appropriate sealing against the ingression of water, the converter can be completely put under water together with the turbine. Due to the arrangement below the water surface, the converter noise at the surface is reduced. Moreover, a smaller converter can be used. With the water, a good cooling is possible and no active air cooling is required. The rotational speed can be set according to the optimal turbine efficiency, independently of the setting of a guide vane device.

It is of advantage if a gas inlet for a sealing gas, especially an inert gas, especially $N_2$, is attached to the gas counterpressure zone of the bell-like enclosure. By doing this, a more increased inside pressure in the enclosure and, in particular, an inert gas atmosphere protecting the generator can be created.

A simple access to the enclosure and, in particular, to the inner journal is possible, if the upper side of the bell-like enclosure is terminated by the covering device with the journal.

The problem is solved as well by means of a cup-like cartridge with a lubricant filling for inserting into a receptacle of a hollow shaft of a turbine device, in particular, according to one of the preceding claims, for containing a cylinder-shaped journal and the bearings surrounding the journal, where the cartridge can be taken out of the hollow shaft without the hollow shaft. The cartridge simplifies the construction of the turbine device, in particular, for a secure bearing of the turbine device and for a quick repair, because the cartridge can be detached and replaced as unit without having to dismount the turbine device.

The problem is also solved by means of a converter to operate a turbine device that is largely used under water, in particular, according to one of the claims 1 to 12, where the converter together with the turbine device is arranged under water and is sealed against the ingression of water.

Through this, the device is very compact without further maintenance-prone cable runs. In particular, together with the ring generator, a low-maintenance turbine device can be obtained in that way.

It is of advantage if, by means of a generator-related rectifier component, an intermediate voltage can be generated that can be converted into a power-network-compliant voltage through a power-network-related infeed inverter. For that purpose, simple and low-priced components are available.

It is of advantage if, by means of a generator-related inverter, a nearly constant intermediate voltage can be created and can be converted into a power-network-compliant voltage through a power-network-side infeed inverter. Particularly in connection with the proposed synchronous ring generator, the nearly constant intermediate voltage allows a very precise generator regulation, particularly with a nearly sinusoidal voltage and a very high efficiency.

The problem is also solved by means of a procedure for operating a turbine device, in particular, according to one of the claims 1 to 12, where a cartridge for holding a lubricant can be taken out by removing a covering device, in particular, for repair and maintenance works.

Further features and advantages of the invention result from the claims and from the following description in which exemplary embodiments of the object of the invention are explained in more detail in connection with the drawings.

It is shown by

FIG. 1 A turbine device and

Figure 2:
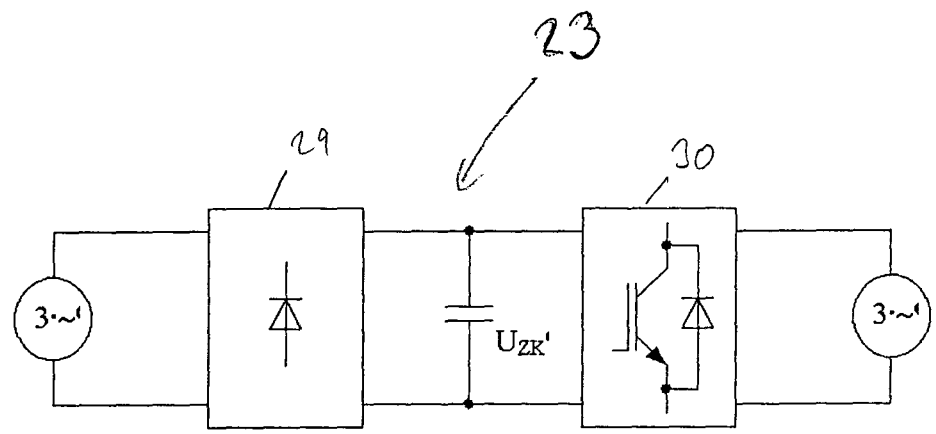
Figure 2:
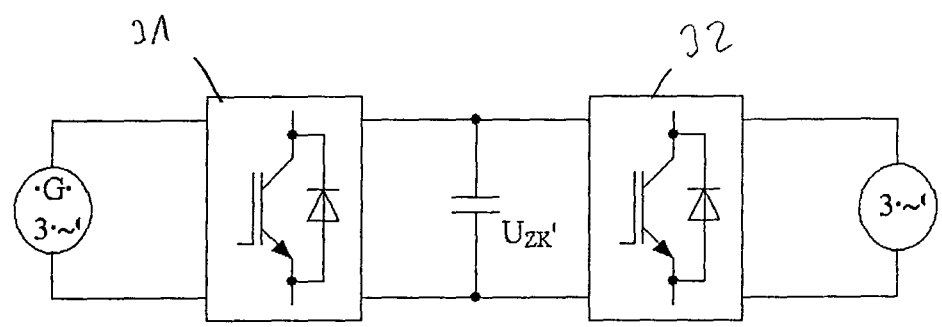

FIG. 2 Converter of a turbine device.

FIG. 1 shows a turbine device 1. The turbine device 1 has a vertical turbine rotation axis 2 around which a hollow shaft 8 with wheel 3 with turbine vanes 4 rotates. The turbine vanes 4 are stationary mounted to the wheel 3, with a fixed angle in relation to the wheel. The turbine device 1 has a ring generator 5. The ring generator 5 has an inner rotor 6 with permanent magnets that is attached to the hollow shaft 8 in rotationally fixed manner. A circumferential, also ring-shaped stator 7 of the ring generator 5 is allocated to the rotor 6. The ring generator can be a synchronous generator and can be operated in speed-variable manner with a converter 23 so that an optimal adjustment of the turbine rotation can be accomplished in case of fixed turbine vanes. The turbine device 1 does not have a gear. The generator works at a low speed and has a multi-pole construction.

A guide vane device 28 causes the water to be guided to the wheel 3 that is driven by the streaming. With the operation as speed-variable synchronous machine, the rotating rotor 6 with its permanent magnets, which have no sliding contacts, creates a three-phase voltage system in the winding of the stator 7. Using the converter 23, this three-phase voltage system is operated in speed-variable manner, particularly between 20 and 120% of the nominal values.

The turbine device 1 is a compact, vertically orientated unit that is assembled as one piece and can be operated completely under water. The device has a converter 23 that is in a very short contact to the ring generator of the turbine device and is combined with the turbine device to form a water-proof unit. Due to this, the converter noise at the water surface is reduced and, in particular, smaller converters are possible. The improvement of the EMC between converter and generator is guaranteed through the direct shielded connection. Due to this, a large distance between turbine and switchgear is possible.

Inside a receptacle 27 of the hollow shaft 8, the turbine device 1 has a removable cartridge 27 that is filled with lubricant 12, in particular, oil, up to an upper bearing 11, in particular of a lower support bearing 13, and, thus, forms a nearly maintenance-free bearing unit that can be mounted and dismounted with the turbine being built in. Due to the very good lubrication, the bearings are running very free without abrasion so that the oil as lubrication stays clean. High temperatures do not arise. The lubricant is not foamed due to the low speeds. The cartridge can be used as bearing unit with bearings that are lubricated for a full lifetime so that a relubrication is not required.

An operation without a sensor is possible. This allows a central access to the bearings.

With a particularly bell-shaped enclosure 15, in the zone 22 of the generator, there is a gas sealing through a gas counterpressure zone 16 toward the ingressing water of the environment. In particular, the gas zone can be pressure-guided, particularly by inert gas. The wear-free gas cushion sealing causes the bearings and the generator to be protected against water. There are no sliding sealings.

FIG. 2 shows a converter 23 of a turbine device 1. The rotational speed can be set according to the optimal turbine efficiency, independently of the setting of the guide vane device. In a exemplary embodiment, the converter 23 has a generator-side unregulated rectifier component 29 and a power-network-side infeed inverter 30. In another exemplary embodiment, the converter can have a generator-side inverter 31 and a power-network-side inverter 32. For this purpose, a fixedly memorized regulation procedure in the converter 23 or, for example, an MPP tracking procedure can be used where a maximum energy application is ensured through the optimization procedure, independently of the properties of the turbine.

An integrated brake chopper can be used to protect the system in case of a power failure.

LIST OF REFERENCE NUMERALS

1 Turbine device
2 Turbine rotation axis
3 Turbine wheel
4 Turbine vane
5 Ring generator
6 Rotor
7 Stator
8 Hollow shaft
9 Receptacle
10 Journal
11 Bearing
12 Lubricant
13 Support bearing
14 Covering device
15 Enclosure
16 Gas counterpressure zone
17 Inside
18 Enclosure wall
19 Protection means
20 Interspace
21 Opening
22 Zone
23 Converter
24 Gas input
25 Sealing gas
26 Upper side
27 Cartridge
28 Guide vane device
29 Rectifier component
30 Infeed inverter
31 Generator-side inverter
32 Infeed inverter
Uzk Intermediate voltage

We claim:

1. Turbine device (1) for a hydropower plant, with a turbine wheel (3) rotating around a particularly vertically orientated turbine rotation axis (2) and having turbine vanes (4) fitted in a, particularly fixed, angle to the turbine wheel (3), with a generator that converts the mechanical rotation energy of the turbine wheel (3) into electrical energy, where the generator is particularly a ring generator (5), with a circular rotor (6) and an accordingly circularly arranged stator (7), characterized by the fact that the turbine rotation axis (2) is coupled to the rotor (6) in a rotationally fixed manner and the rotation around the turbine rotation axis (2) is carried out by a hollow shaft (8), with a cup-like receptacle (9) into which a fixed journal (10) with circumjacently arranged movable bearings (11) is particularly directly inserted, and the turbine wheel (3) and the rotor (6) are rotable around the journal (10);

characterized by the fact that the cup-like receptacle (9) is formed by a cartridge (27) coupled to the hollow shaft (8) in a rotationally fixed manner, where the cartridge (27) contains the lubricant and the journal (10) with the bearings (11).

2. Turbine device (1) for a hydropower plant, with a turbine wheel (3) rotating around a particularly vertically orientated turbine rotation axis (2) and having turbine vanes (4) fitted in a, particularly fixed, angle to the turbine wheel (3), with a generator that converts the mechanical rotation energy of the turbine wheel (3) into electrical energy, where the generator is particularly a ring generator (5), with a circular rotor (6) and an accordingly circularly arranged stator (7), characterized by the fact that the turbine rotation axis (2) is coupled to the rotor (6) in a rotationally fixed manner and the rotation around the turbine rotation axis (2) is carried out by a hollow shaft (8), with a cup-like receptacle (9) into which a fixed journal (10) with circumjacently arranged movable bearings (11) is particularly directly inserted, and the turbine wheel (3) and the rotor (6) are rotable around the journal (10); characterized by the fact that a gas inlet (24) for a sealing gas (25), especially an inert gas, especially $N_2$, is attached to the gas counterpressure zone (16) of the bell-like enclosure (15).

3. Turbine device (1) for a hydropower plant, with a turbine wheel (3) rotating around a particularly vertically orientated turbine rotation axis (2) and having turbine vanes (4) fitted in a, particularly fixed, angle to the turbine wheel (3), with a generator that converts the mechanical rotation energy of the turbine wheel (3) into electrical energy, where the generator is particularly a ring generator (5), with a circular rotor (6) and an accordingly circularly arranged stator (7), characterized by the fact that the turbine rotation axis (2) is coupled to the rotor (6) in a rotationally fixed manner and the rotation around the turbine rotation axis (2) is carried out by a hollow shaft (8), with a cup-like receptacle (9) into which a fixed journal (10) with circumjacently arranged movable bearings (11) is particularly directly inserted, and the turbine wheel (3) and the rotor (6) are rotable around the journal (10); where a cartridge (27) for holding a lubricant (12) can be taken out by removing a covering device (14), in particular, for repair and maintenance works.

* * * * *